United States Patent
Yoshida et al.

[11] Patent Number: 6,163,141
[45] Date of Patent: Dec. 19, 2000

[54] ELECTRONIC APPARATUS FOR STOPPING SUPPLY OF POWER TO LOAD DURING VOLTAGE DETECTION OPERATION

[75] Inventors: Yoshifumi Yoshida; Fumiyasu Utsunomiya, both of Chiba, Japan

[73] Assignee: Seiko Instruments R&D Center Inc., Japan

[21] Appl. No.: 09/235,672

[22] Filed: Jan. 22, 1999

[30] Foreign Application Priority Data

Jan. 28, 1998 [JP] Japan ................................. 10-015394
Feb. 16, 1998 [JP] Japan ................................. 10-032650
Nov. 13, 1998 [JP] Japan ................................. 10-323824

[51] Int. Cl.[7] .................. G05F 1/40; G05F 1/44; G05F 1/56
[52] U.S. Cl. ........................................... 323/266; 323/284
[58] Field of Search ............................. 323/207, 266, 323/282, 284, 285; 363/16

[56] References Cited

U.S. PATENT DOCUMENTS

| | | | |
|---|---|---|---|
| 5,107,138 | 4/1992 | Seki et al. | 307/296.1 |
| 5,224,025 | 6/1993 | Divan et al. | 363/16 |
| 5,307,005 | 4/1994 | Ahladas | 323/222 |
| 5,313,382 | 5/1994 | Farrington | 363/16 |
| 5,357,415 | 10/1994 | Kramer | 363/21 |
| 5,404,092 | 4/1995 | Gegner | 323/207 |
| 5,461,301 | 10/1995 | Truong | 323/207 |
| 5,528,087 | 6/1996 | Sibata et al. | 307/66 |
| 5,565,762 | 10/1996 | Ishikawa et al. | 323/222 |
| 5,598,092 | 1/1997 | Ohtsuka et al. | 323/222 |
| 5,614,811 | 3/1997 | Sagalovich et al. | 323/207 |
| 5,642,267 | 6/1997 | Brkovic et al. | 363/16 |
| 5,654,626 | 8/1997 | Karlsson | 323/222 |
| 5,668,466 | 9/1997 | Vinciarelli et al. | 323/282 |
| 5,804,950 | 9/1998 | Hwang et al. | 323/222 |
| 5,831,420 | 11/1998 | Myers | 323/282 |

FOREIGN PATENT DOCUMENTS 593257 2/1994 European Pat. Off. ....... H02M 3/335

*Primary Examiner*—Shawn Riley
*Assistant Examiner*—Bao Q. Vu
*Attorney, Agent, or Firm*—Adams & Wilks

[57] ABSTRACT

An electronic apparatus which controls the driving of a load circuit in accordance with a detected feed power voltage. The feed power voltage can be accurately detected even when it is low. In order to achieve this, the apparatus in one embodiment includes a power feed unit, a boosting circuit for increasing a voltage of the supply power, a voltage detecting circuit for detecting the voltage of the supply power as increased by the boosting circuit and outputting a voltage detection signal, and the load circuit which is driven based on the supply power. A voltage detection circuit detects the supply voltage only when it is not being used to drive the load circuit.

15 Claims, 7 Drawing Sheets

ELECTRONIC APPARATUS FOR STOPPING SUPPLY OF POWER TO LOAD DURING VOLTAGE DETECTION OPERATION

BACKGROUND OF THE INVENTION

The present invention relates to an electronic apparatus, and more particularly to an electronic apparatus which is adapted to drive a load circuit based on an electric power supplied from a power feed unit having a supply power with voltage varying in time, for example, an electronic apparatus that operates a load circuit with an electric power supplied from a generator such as a thermoelectric converting element.

FIG. 7 is a schematic block diagram of a conventional electronic apparatus. In FIG. 7, an electronic apparatus 700 is provided with a power feed unit 10 having a supply power with voltage varying in time, a load circuit 30 operating on a power supplied by the power feed unit 10, and a voltage detecting circuit for detecting a voltage of a power supplied by the power feed unit 10 and outputting a voltage detection signal based on the voltage to the load circuit.

In such an electronic apparatus, a reduction in size and weight also requires one to reduce the size and weight of the power feed unit 10, resulting in a tendency toward decrease in power in the power feed unit 10. This in turn induces a tendency decrease the power supply voltage to be supplied by the power feed unit 10.

Under such a circumstance, a conventional electronic apparatus has incorporated a generator and etc., which was configured as shown in FIG. 7 by a power feed unit 10 to have electric power or voltage varying in time, a voltage detecting circuit 20 for detecting an output voltage of the power supply unit 10 to determine a power feeding ability of the power feed unit 10 based on the detected voltage and outputting a voltage detection signal dependent upon the power feeding ability of the power supply unit 10, and a load circuit 30 operating on a power supplied by the power feed unit 10 and controlled in operation by the voltage detection signal.

In the above configuration, because the voltage detecting circuit 20 is limited to its detectable minimum voltage value (minimum detection voltage), when the power voltage supplied by the power feed unit 10 decreases below the minimum detection voltage value, the voltage detecting circuit 20 cannot detect a voltage of the power feed unit 10. In the meanwhile, the power and voltage supplied by the power feed unit 10 tends to decrease, as stated above. Moreover, the output voltage of the power feed unit 10 is detected while the load circuit 30 is consuming the power supplied by the power feed unit. Consequently, the output voltage of the power feed unit 10 is affected by a power consuming state in the load circuit 30, besides the reduction in the output voltage of the power feed unit 10.

That is, in the conventional electronic apparatus as described above, there is often a case that the voltage detecting circuit 20 cannot detect an output voltage of the power feed unit 10. The voltage detecting circuit 20 cannot grasp a power feedability of the power feed unit 10, and hence cannot output a voltage detection signal dependent upon the power feedability. That is, there was a problem in that it was impossible to control the operation of the load circuit 30 depending upon the power feedability of the power feed unit 10. Furthermore, even if the voltage detecting circuit 20 can detect an output voltage of the power feed unit 10, the output voltage of the power feed unit 10 is determined by a power consuming state in the load circuit 30. Due to this, the power feedability of the power feed unit 10 cannot be grasped by the power voltage supplied by the power feed unit 10. As a result, the voltage detecting circuit 20 might output a voltage detection signal irrespective of the power feedability of the power feed unit 10. Thus there was a problem in that the operation of the load circuit 30 was controlled in a manner irrespective of the power feedability of the power feed unit 10.

Particularly, if the conventional electronic apparatus configuration is adopted for a watch that operates on an electric power generated by a thermoelectric converting element due to a temperature difference between the arm and the ambient air, the thermoelectric converting element as the power feed unit 10 requires an increased number of series P-type and N-type columns to increase a time period during which is generated a power voltage higher than a minimum detection voltage for the voltage detecting circuit 20. It is accordingly difficult to accommodate the thermoelectric converting element within the watch. In order to accommodate the thermoelectric element within the watch, there is no way but to decrease the number of the series columns. This, however, increases the time period during which the voltage detecting circuit 20 can not detect the voltage of the thermoelectric converting element. In the case that the number of the series columns has to be decreased, there is a possibility that no detection can be made. On the other hand, if the thermoelectric converting element can be accommodated within the watch with the number of series columns left large, the thermoelectric converting element is increased in internal resistance. This may cause the voltage of the thermoelectric converting element to drop the moment the power of the thermoelectric converting element is supplied to the load circuit 30, resulting in an increase in the time period for which the minimum detection voltage of the voltage detecting circuit 20 is not reached. Meanwhile, where the load circuit 30 consumes much power, there may be a case that the voltage of the thermoelectric converting element does not exceed the minimum detection voltage. This increases the time period during which the voltage detecting circuit 20 can not detect the voltage of the thermoelectric converting element. In a worst case, there is a possibility that no time period is obtained for detection. Even if the voltage detecting circuit 20 can detect a voltage of the thermoelectric converting element, it is difficult to grasp from such a voltage a power feedability of the thermoelectric converting element. As stated above, where the conventional electronic apparatus configuration is adopted for a watch, the power generating ability of the thermoelectric converting element is difficult to be grasped, resulting in difficulty in controlling the operation responsive to the power generating ability.

For example, where the conventional electronic apparatus configuration is adopted for the watch so that a generated power by the thermoelectric converting element as the power feed unit 10 is converted into a voltage-increased power by a boosting circuit as the load circuit 30 and supplied to an accumulator and watch drive circuit also as the load circuit 30, the power generating ability of the thermoelectric converting element is difficult to be grasped because of the above-described reasons with a result that it is difficult the boosting circuit to set a voltage magnification in compliance with a power generating ability or the like. Thus there has been encountered a problem of difficulty in generating a voltage-increased power suited for charge storage on the accumulator or for the watch drive circuit, and hence a problem of difficulty in utilizing a power generated by the thermoelectric converting element.

SUMMARY OF THE INVENTION

It is therefore an object of the present invention to increase a time period of detectability by a voltage detecting circuit 20 of a power feedability or feed power voltage staying below a minimum detection voltage of the voltage detecting circuit 20 in order to reduce the size and weight of an electronic apparatus and further to grasp a power feedability of the power feed unit 10 from the feed power voltage detected on the power feed unit 10, thereby utilizing a voltage detection signal for various functions of the electronic apparatus in response to the feed power detected on the power feed unit 10.

In order to solve the above problems, an electronic apparatus according to the present invention comprises: a power feed unit having a supply power varying with time; a boosting means for increasing a voltage of the supply power; a voltage detecting circuit for detecting the voltage of the supply power increased by the boosting means and outputting a voltage detection signal; and a load circuit operating on the supply power and changing a drive state responsive to the voltage detection signal.

The boosting means may be a means for causing the supply power not to be consumed by the load circuit in order to increase the voltage of the supply power.

The boosting means may be a boosting circuit for increasing the voltage of the supply power.

Also, an electronic apparatus comprises: a power feed unit having a supply power varying with time; a boosting circuit for increasing a voltage of the supply power to generate a voltage-increased power; a load circuit operating on the supply power or the voltage-increased power; a power control means for controlling whether or not the supply power or the voltage-increased power is to be consumed by the load circuit; and a voltage detecting circuit for detecting the voltage of the voltage-increased power and outputting a voltage detection signal responsive to the voltage when the power control means is in a state that the supply power or the voltage-increased power is not consumed by the load circuit.

Also, an electronic apparatus comprises: a power feed unit having a supply power varying with time; a boosting circuit for increasing a voltage of the supply power to generate a voltage-increased power; a reverse flow preventing means; an accumulator for storing as a stored power the voltage-increased power or the supply power supplied through the reverse flow preventing means; a drive circuit for effecting drive by the supply power, the voltage-increased power or the stored power; a power control means for controlling whether or not the supply power or the voltage-increased power is to be consumed by the boosting circuit or the load circuit, and whether or not the supply power or the voltage-increased power is to be stored on the accumulator; a voltage detecting circuit for detecting the voltage of the supply power and outputting a voltage detection signal responsive to the voltage when the power control means is in a state that the supply power is not consumed by the boosting circuit or the drive circuit and in a state that the supply power is not stored on the accumulator; and a voltage magnification control circuit for generating a voltage magnification signal responsive to the voltage detection signal; whereby the boosting circuit changes the voltage magnification responsive to the voltage magnification control signal.

Also, an electronic apparatus comprises: a power feed unit having a supply power varying with time; a boosting circuit for increasing a voltage of the supply power to generate a voltage-increased power; a reverse flow preventing means; an accumulator for storing as a stored power the voltage-increased power or the supply power supplied through the reverse flow preventing means; a drive circuit for effecting drive by the supply power, the voltage-increased power or the stored power; a power control means for controlling on whether or not the supply power or the voltage-increased power is to be consumed by the load circuit, and whether or not the supply power is to be stored on the accumulator; a voltage detecting circuit for detecting the voltage of the voltage-increased power and outputting a voltage detection signal responsive to the voltage in a state that the voltage-increased power is not consumed by the drive circuit or is not stored on the accumulator; and a voltage magnification control circuit for generating a voltage magnification control signal responsive to the voltage detection signal; whereby the boosting circuit changes the voltage magnification responsive to the voltage magnification control signal.

Also, an electronic apparatus comprises: a power feed unit having a supply power varying with time; a boosting circuit for increasing a voltage of the supply power to generate a voltage-increased power; a reverse flow preventing means; an accumulator for storing as a stored power the supply power supplied through the reverse flow preventing means or the voltage-increased power; a drive circuit for effecting drive by the supply power, the voltage-increased power or the stored power; a voltage detecting circuit for detecting the voltage of the voltage-increased power and outputting a voltage detection signal responsive to the voltage; and a voltage magnification control circuit for generating a voltage magnification control signal responsive to the voltage detection signal; whereby the boosting circuit changes the voltage magnification responsive to the voltage magnification control signal; the voltage magnification control circuit having a first state to output the voltage magnification control signal responsive to the voltage detection signal and a second state to output the voltage magnification control signal with a voltage magnification below the voltage magnification of the first state; and the voltage detecting circuit only in the second state detects the voltage of the voltage-increased power and outputting a voltage detection signal responsive to the voltage.

DETAILED DESCRIPTION OF THE PREFERRED EMBODIMENTS

Now explanations will be made on an electronic apparatus according to embodiments of the present invention with reference to the drawings.

(Embodiment 1)

Figure 1:
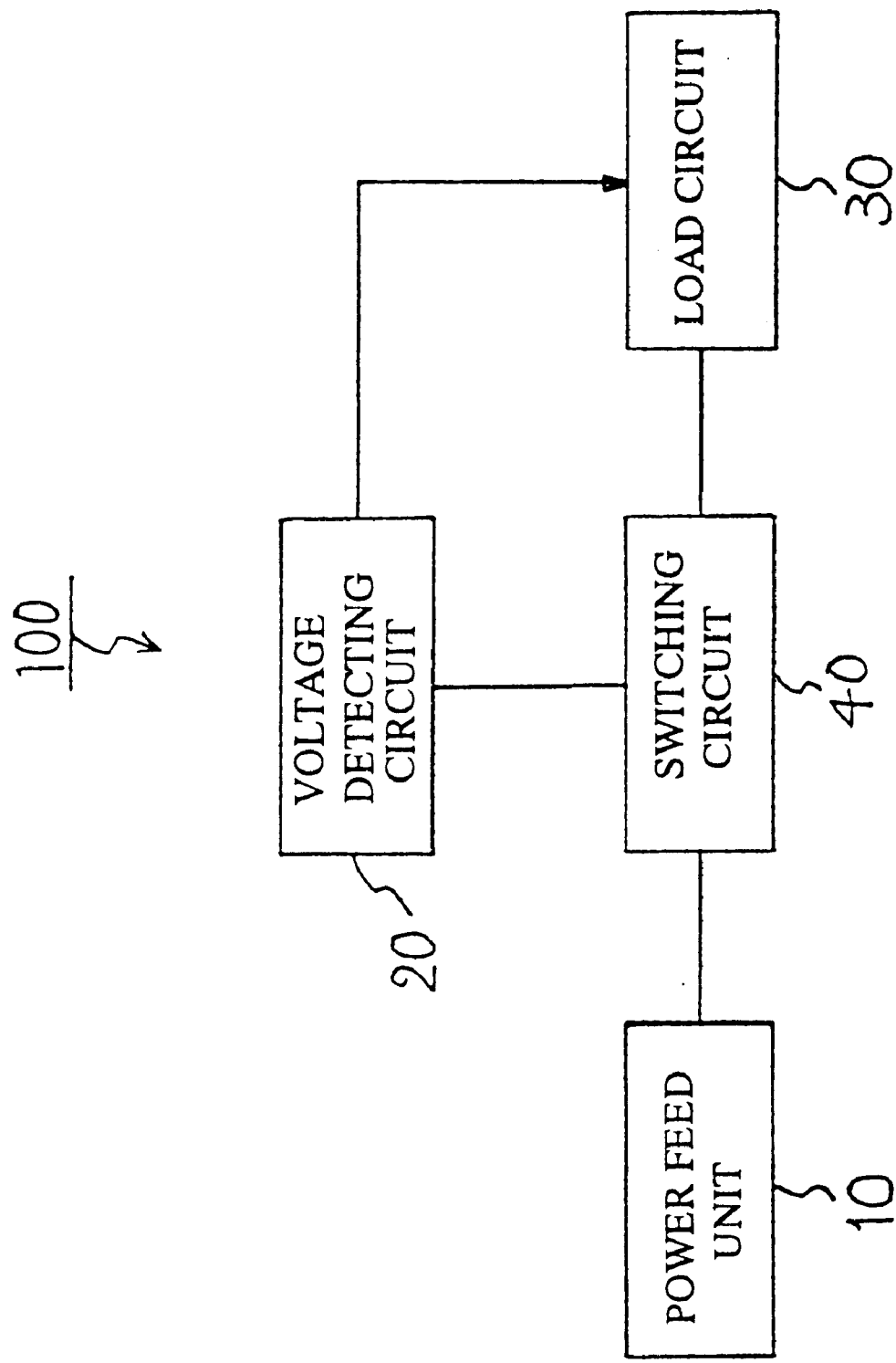
FIG. 1 is a schematic block diagram of an electronic apparatus showing Embodiment 1 of the present invention.

FIG. 1 is a schematic block diagram of an electronic apparatus according to embodiment 1 of the present invention. The electronic apparatus of Embodiment 1 is configured by employing a switching circuit 40 as the voltage increasing means as stated before. As shown in FIG. 1, an electronic apparatus 100 is provided with a power feed unit 10 having a feed power or voltage varying in time, a voltage detecting circuit 20 for detecting a feed power voltage of the power feed unit 10 and outputting a voltage detection signal depending on the detected voltage, a load circuit 30 operated by the feed power of the power feed unit 10, and a switching circuit 40 that can assume two states depending on time, i.e., a first state in which the feed power of the power feed unit 10 is supplied only to the load circuit 30 and a second state in which the feed power of the power feed circuit 10 is supplied only to the voltage detecting circuit 20.

In the electronic apparatus 100 thus configured, the voltage detecting circuit 20 detects a feed power voltage only when the switching circuit 40 is in the second state, and determines a power feedability of the power feed unit 10 based on the detected feed power voltage to thereby output a voltage detection signal depending on the power feedability. Receiving this voltage detection signal, the load circuit 30 operates responsive to the power feedability of the power feed unit 10. Meanwhile, the provision of the switching circuit 40 can create a state in which the feed power of the power feed unit 10 is not consumed by the load circuit 30. This can eliminate the drop in feed power voltage due to consumption of the feed power by the load circuit 30. Accordingly, even if the feed power of the power feed unit 10 considerably decreases, the feed power voltage can afford to exceed a minimum detection voltage of the voltage detecting circuit 20. That is, the voltage detecting circuit 20 is allowed to detect a feed power voltage even where the feed power of the power feed unit 10 is considerably low. It is therefore possible to increase a time period for which the voltage detecting circuit 20 is capable of detecting a feed power voltage. Furthermore, the feed power voltage of the power feed unit 10 becomes dependent upon a power feedability of the power feed unit 10, irrespectively of the power consumption by the load circuit 30. Due to this, the voltage detecting circuit 20 can accurately grasp a power feedability of the power feed unit 10 from the power feed voltage detected by the voltage detecting circuit. Accordingly, the load circuit 30 is put under control of operation dependent upon a power feedability of the power feed unit 10.

Here, the switching circuit 40 is not limited to the above configuration but may be in any form provided that it possesses a function such that the feed power of the power feed unit 10 is not consumed by the load circuit 30. For example, it is possible to use a circuit to output a load circuit suspension signal to cause the load circuit 30 to be suspended in operation.

(Embodiment 2)

Figure 2:
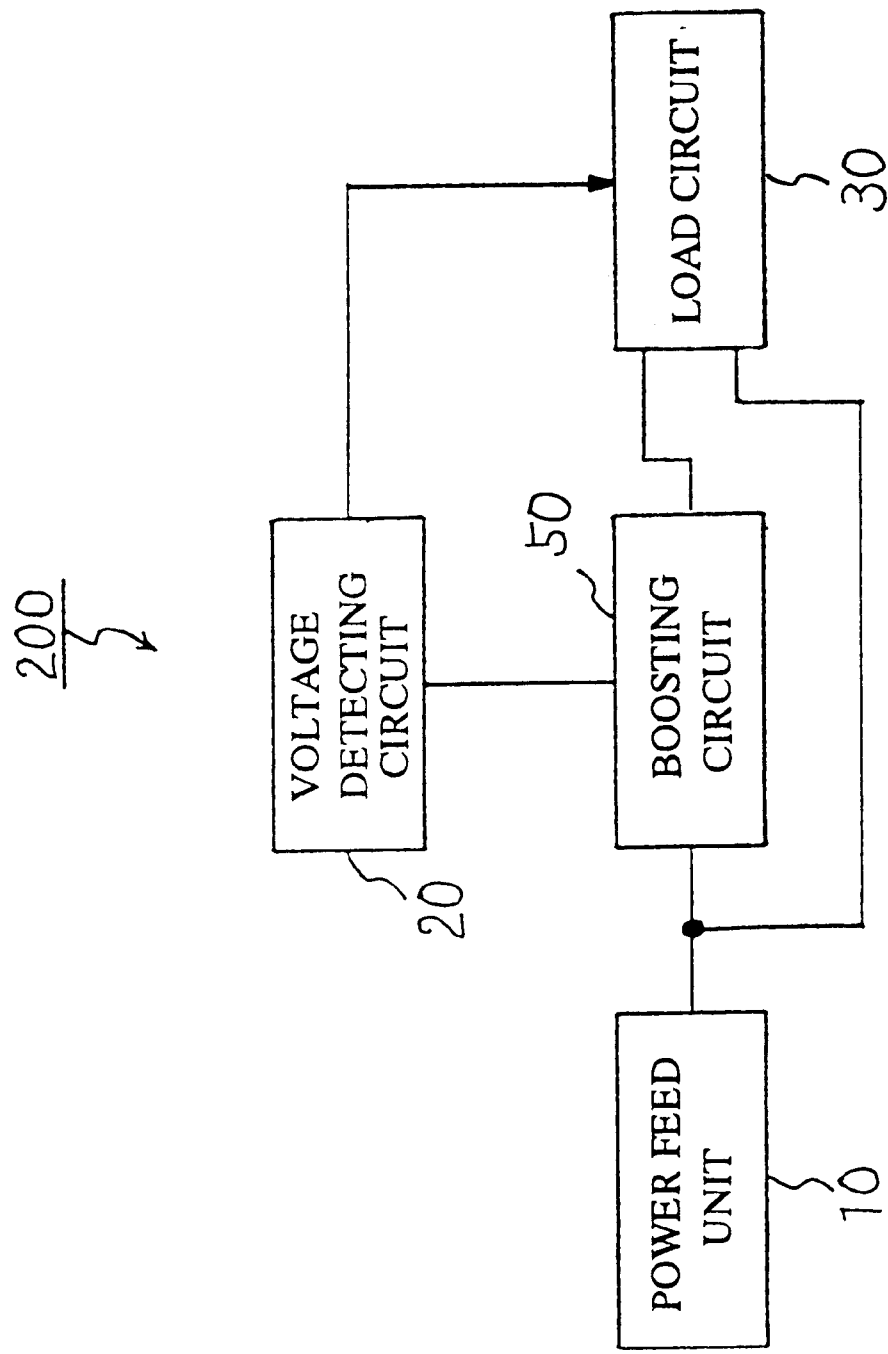
FIG. 2 is a schematic block diagram of an electronic apparatus showing Embodiment 2 of the present invention.

FIG. 2 is a schematic block diagram of an electronic apparatus according to embodiment 2 of the present invention. The electronic apparatus of Embodiment 2 is configured by using a boosting circuit 50 as the voltage increasing means stated before. As shown in FIG. 2, an electronic apparatus 200 is provided with a power feed unit 10 having a feed power or voltage varying in time, a boosting circuit 50 for outputting a voltage-increased power of the feed power from the power feed unit 10, a voltage detecting circuit 20 for detecting the boosted voltage outputted by the boosting circuit 50 and outputting a voltage detection signal depending upon the detected increased voltage, and a load circuit 30 operating on the feed power of the power feed unit 10 or the increased voltage by the boosting circuit 50.

With such a configuration, the voltage detecting circuit 20 can detect the voltage that a feed power voltage of the power feed unit 10 is increased by the boosting circuit 50. Due to this, even if the feed power voltage is considerably low, the voltage of the voltage-increased power is allowed to exceed a minimum detection voltage of the voltage detecting circuit 20. Accordingly, the voltage detecting circuit 20 can afford to output a voltage detection signal if the feed power of the power feed unit 10 is at a certain level or higher.

In this structure, however, the feed power of the power feed unit 10 or the voltage-increased power of the boosting circuit 50 is detected by the voltage detecting circuit 20 in a state that the power is consumed by the load circuit 30. That is, the increased voltage is affected by the consumption of power by the load circuit 30. Accordingly, the voltage detecting circuit 20, if detecting the increased voltage, cannot grasp a power feedability of the power feed unit 10. In other words, the voltage detection signal for this case is a mere signal representing that the power feed unit 10 has a certain level of a power feedability. It is therefore impossible to cause the load circuit 30 to vary in operation in response to the power feedability of the power feed unit 10. The load circuit 30 can be controlled only in a manner such that its operation is varied depending on whether or not the power feedability of the power feed unit 10 is at a certain level or higher.

Here, the boosting circuit 50 may use any voltage increasing method, preferably a switched capacitor method configured by a switch and capacitor that is small in size, light in weight and high in efficiency. Furthermore, the increased voltage by the boosting circuit 50, to be detected by the voltage detecting circuit 20, may be an increased voltage outputted from the boosting circuit 50. Alternatively, if the boosting circuit 50 can be configured to output an intermediate increased voltage that is higher than the feed power voltage of the power feed unit 10 and lower than the increased voltage generated at an output of the boosting circuit 50, such intermediate voltage may be used.

(Embodiment 3)

Figure 3:
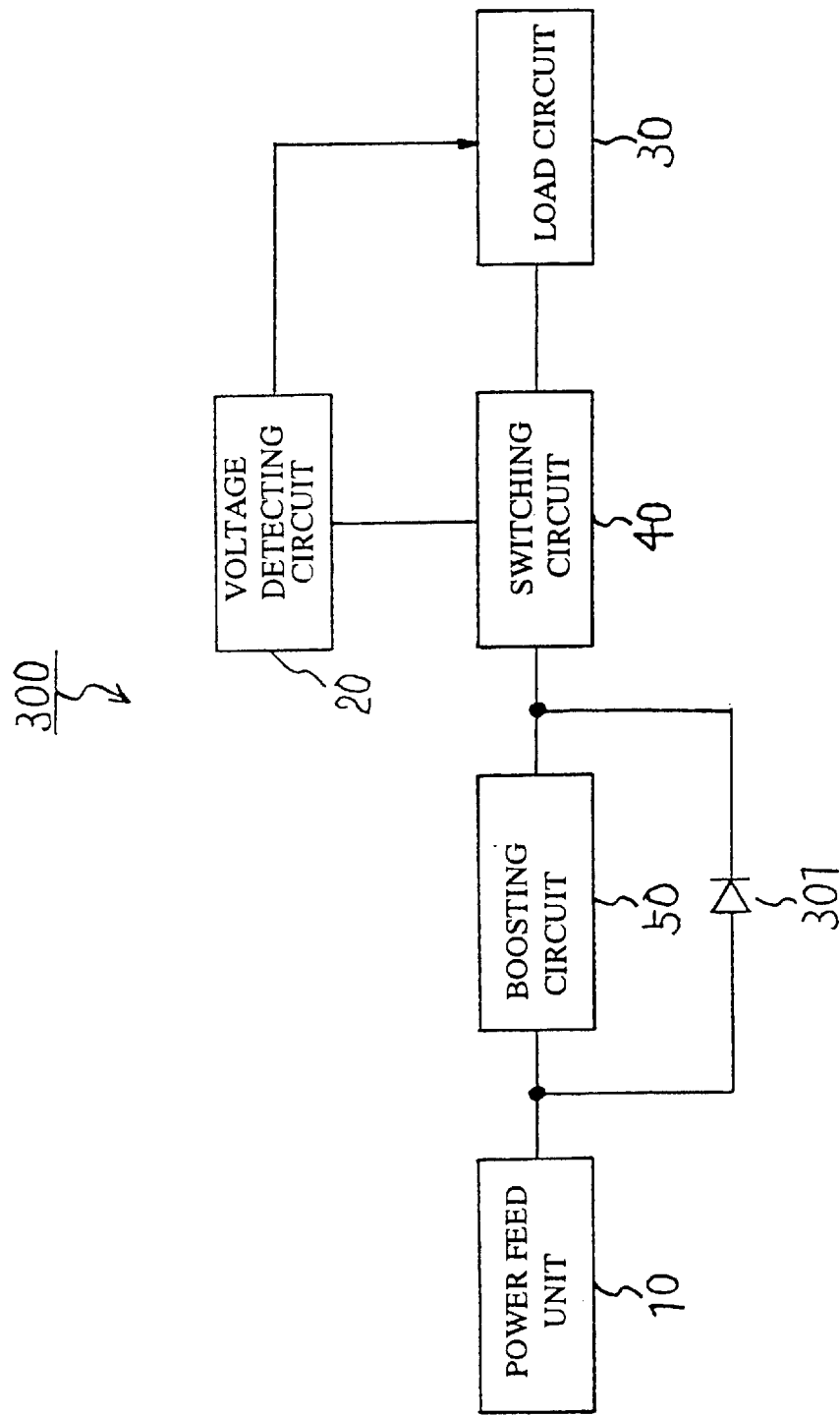
FIG. 3 is a schematic block diagram of an electronic apparatus showing Embodiment 3 of the present invention.

FIG. 3 is a schematic block diagram of an electronic apparatus according to embodiment 3 of the present invention. As shown in FIG. 3, an electronic apparatus 300 is provided with a power feed unit 10 having a feed power or voltage varying in time, a boosting circuit 50 for increasing the voltage of the feed power from the power feed unit 10 and outputting a voltage-increased power, a diode element 301 for supplying the feed power to an output of the boosting circuit 50 without passing through the boosting circuit 50, a voltage detecting circuit 20 for detecting a voltage of the voltage-increased power and outputting a voltage detection signal depending upon the detected increased voltage, a load circuit 30 operating on the feed power supplied through the diode element 301 or the voltage-increased power, and a switching circuit 40 as a power control means that can assume two states depending on time, i.e., a first state in which the feed power supplied by the increased voltage or through the diode element 301 is supplied only to the load circuit 30 and a second state in which the feed power is supplied only to the voltage detecting circuit 20.

In the electronic apparatus 300 thus configured, the voltage detecting circuit 20 detects a voltage of the voltage-increased power only when the switching circuit 40 is assuming the second state, and determines a power feedability of the power feed unit 10 based on the detected voltage to thereby output a voltage detection signal responsive to the power feedability. The load circuit 30 receives the voltage detection signal and operates responsive to the power feedability of the power feed unit 10. Incidentally, the diode element 301 is provided to cause the load circuit 30 to directly operate using the feed power where the feed power of the power feed unit 10 is sufficient in power and voltage for operating the load circuit 30.

With such a configuration, the voltage detecting circuit 20 detects the voltage that a voltage of the feed power is increased by the boosting circuit 50. That is, even if the feed power voltage of the power feed unit 10 is considerably low, the voltage of the voltage-increased power is allowed to exceed a minimum detection voltage of the voltage detecting circuit 20. Accordingly, the voltage detecting circuit 20 can detect the voltage. That is, the voltage detecting circuit 20 can output a voltage detection signal if the feed power of the power feed unit 10 is at a certain level or higher.

Furthermore, it is possible to create a state in which the voltage-increased power is not consumed by the load circuit 30. The voltage of the voltage-increased power thereupon increases nearly to a voltage of the feed power, being not consumed by the load circuit 30, multiplied by a voltage magnification of the boosting circuit 50. That is, the voltage of feed power being not consumed by the load circuit 30 is determined by detecting a voltage of the voltage-increased power being not consumed at the load circuit 30 by the voltage detecting circuit 20 and then dividing the detected voltage by the voltage magnification. By outputting a voltage detection signal commensurate with the determined voltage, the load circuit 30 is allowed to operate responsive to the power feedability of the power feed unit 10.

Here, the increased voltage of the boosting circuit 50 to be detected by the voltage detecting circuit 20 may be an increased voltage as an output from the boosting circuit 50. Alternatively, that increased voltage may be, if available, an intermediate increased voltage that is higher than the feed power voltage of the power feed unit 10 and lower than the increased voltage generated at the output of the boosting circuit 50. Moreover, the switching circuit 40 may be in any form provided that has such a function that the feed power of the power feed unit 10 is not consumed by the load circuit 30. For example, it is possible to use a circuit for outputting a load circuit suspending signal in order to suspend the operation of the load circuit 30.

(Embodiment 4)

Figure 4:
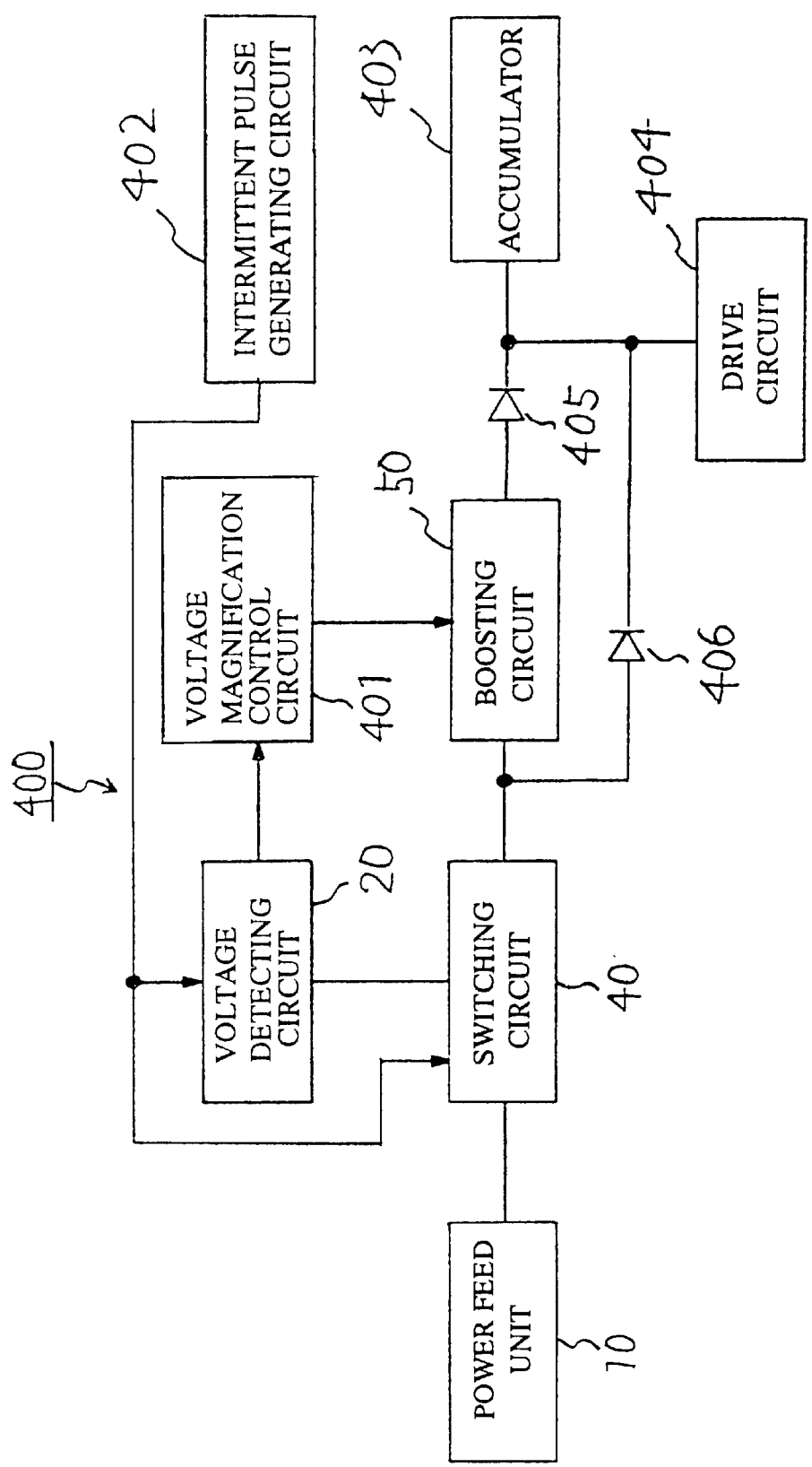
FIG. 4 is a schematic block diagram of an electronic apparatus showing Embodiment 4 of the present invention.

FIG. 4 is a schematic block diagram of an electronic apparatus according to embodiment 4 of the present invention. As shown in FIG. 4, an electronic apparatus 400 is provided with a power feed unit 10 having a feed power or voltage varying in time, a boosting circuit 50 for increasing the voltage of the feed power from the power feed unit 10 and outputting an voltage-increased power, an accumulator 403 for storing as a storage power the feed power or voltage-increased power, a drive circuit 404 supplied with the feed power, the voltage-increased power and the stored power to perform drive operation, a first diode element 405 for supplying the voltage-increased power to the accumulator 403 or the drive circuit 404 and preventing the stored power from reversely flowing toward the output of the boosting circuit 50, a second diode element 406 for supplying the feed power to the drive circuit 404 or the accumulator 403 without passing through the boosting circuit 50 and preventing the stored power from reversely flowing into the power feed unit 10, a voltage detecting circuit 20 for detecting a voltage of the feed power to output a voltage detection signal depending upon the detected voltage, a switching circuit 40 as a power control means that can assume two state depending on time, i.e., a first state in which the feed power is supplied only to the boosting circuit 50, the accumulator 403, or the drive circuit 404 and a second state in which the feed power is supplied only to the voltage detecting circuit 20, a voltage magnification control circuit 401 for outputting to the boosting circuit 50 a voltage magnification control signal dependent upon the voltage detection signal, and an intermittent pulse generating circuit 402 for outputting an intermittent pulse signal.

In the electronic apparatus 400 thus configured, the switching circuit 40 is switched over between the first state and the second state depending on the intermittent pulse. Further, the voltage detecting circuit 20 receives an intermittent pulse to acknowledge that the switching circuit 40 is in the first state. The voltage detecting circuit 20 performs voltage detection each time the first state is entered into, and outputs a new voltage detection signal for each of the detected voltages. The boosting circuit 50 changes the voltage magnification in compliance with the voltage magnification control signal. Incidentally, the diode element 406 is provided to store the feed power in the accumulator 403 when the feed power voltage of the power feed unit 10 is nearly twice the voltage of the accumulator 403, i.e., when the efficiency of power storage is higher in the case that the feed power is directly stored the accumulator 403 than when it is stored through the boosting circuit 50 into the accumulator 403.

If the switching circuit 40 is not provided in the above configuration and the voltage detecting circuit 20 has to detect a feed power voltage of the power feed unit 10 while consumption of the feed power occurs by the boosting circuit 50, the accumulator 403 or the drive circuit 404, the feed power voltage is decreased. Where there is such a decrease, even if slight, in the feed power, the voltage detecting circuit 20 cannot detect a voltage of the feed power. Further, where the power feed unit 10 is high in internal resistance and the accumulator 403 is low in storage resistance and the boosting circuit 50 is high in voltage-increased power produceability, the voltage of the feed power of the power feed unit is fixed at the voltage that is a voltage of the accumulator 403 divided by a voltage magnification of the boosting circuit 50. This voltage is not dependent upon the power feedability of the power feed unit 10. That is, despite the fact that the voltage detecting circuit 20 can detect a voltage of the feed power, the power feedability of the power feed unit 10 cannot be grasped from that voltage. Accordingly, there may be a case that no voltage detection signal is output from the voltage detecting circuit 20. If it can be output, it is not dependent on the power feedability. Consequently, the voltage magnification control circuit 401 cannot output a voltage magnification control signal in compliance with the power feedability. It is impossible to establish a voltage magnification by the boosting circuit 50 in a manner best suited for charge storage on the accumulator 403. As a result, the feed power of the power feed unit 10 cannot be stored with efficiency on the accumulator 403, resulting in a disadvantage of difficulty in long-time operation.

In the electronic apparatus 400 of the invention shown in FIG. 4, however, the provision of the switching unit offers a state in which the feed power voltage of the power feed unit 10 is not consumed by the boosting circuit 50, the accumulator 403 or the drive circuit 404. That is, the voltage detecting circuit 20 can detect a feed power voltage in a state that the feed power is increased in voltage. Moreover, the detected voltage accurately corresponds to the power feedability of the power feed unit 10. Due to this, even if the feed power of the power feed unit 10 is decreased to a certain level, the voltage detecting circuit 20 is allowed not only to detect a feed power voltage but also to output a voltage detection signal matched to the power feedability of the power feed unit 10. Consequently, the voltage magnification control circuit 401 outputs a voltage magnification control signal dependent upon a power feedability so that the boosting circuit 50 can in turn set a voltage increase magnification best suited for charge storage on the accumulator 403. As a result, the feed power of the power feed unit 10 can be efficiently stored on the accumulator 403, and accordingly the electronic apparatus 400 of the invention constructed as above is allowed to operate for a long period of time.

Incidentally, the method used to determine a magnification of voltage increase dependent upon feed power and best suited for charge storage on the accumulator differs based on the equivalent circuit of the power feed unit 10, the boosting method of the boosting circuit 50, the kind of accumulator 403 or the forward drop voltage across the diode element 405. For example, where the power feed unit 10 is a thermoelectric converting element, the boosting circuit 50 is of a switched capacitor type formed by a capacitor and switch means, the accumulator 403 is a Li-based secondary battery low in charge resistance, and the diode element 405 is of a schottky barrier type with an extremely low forward drop voltage, the voltage increasing magnification is most ideally set with the diode element drop voltage neglected such that the voltage determined by the feed power voltage detected at the voltage detecting circuit 20 multiplied by a voltage magnification is equal to a voltage of twice the voltage across the accumulator 403.

Meanwhile, as the time period for which the switching circuit 40 is in the first state becomes shorter and the time interval between the first states is longer, the time period for which the accumulator 403 is being charged becomes longer, thus resulting in higher charge storing efficiency. However, these conditions should be optimally set based on the power feedability of the power feed unit 10 and the variation in feed power.

In the configuration of the invention shown in FIG. 4, if the electronic apparatus 400 is adopted for a watch by using a power feed unit 10 as a generator and the drive circuit 404 as a watch drive circuit, then generated power can be effectively stored the accumulator. This realizes a watch that operates on generated power for a long period of time. If the operation time is satisfactorily the same as that of the conventional device, the generator can be made small in size and light in weight thus realizing a watch operable on correspondingly small, light generated power.

The switching circuit 40 is not limited to the configuration with the function stated as above, but may be in any form provided that it has a function such that the feed power from the power feed unit 10 is consumed only by the voltage detecting circuit 20. For example, such a circuit may be configured that no feed power is consumed by the boosting circuit 50 and the drive circuit 404 wherein the supply of feed power to the accumulator 403 is cut off to suspend the operation of the booster circuit 50 and the drive circuit 404.

(Embodiment 5)

Figure 5:
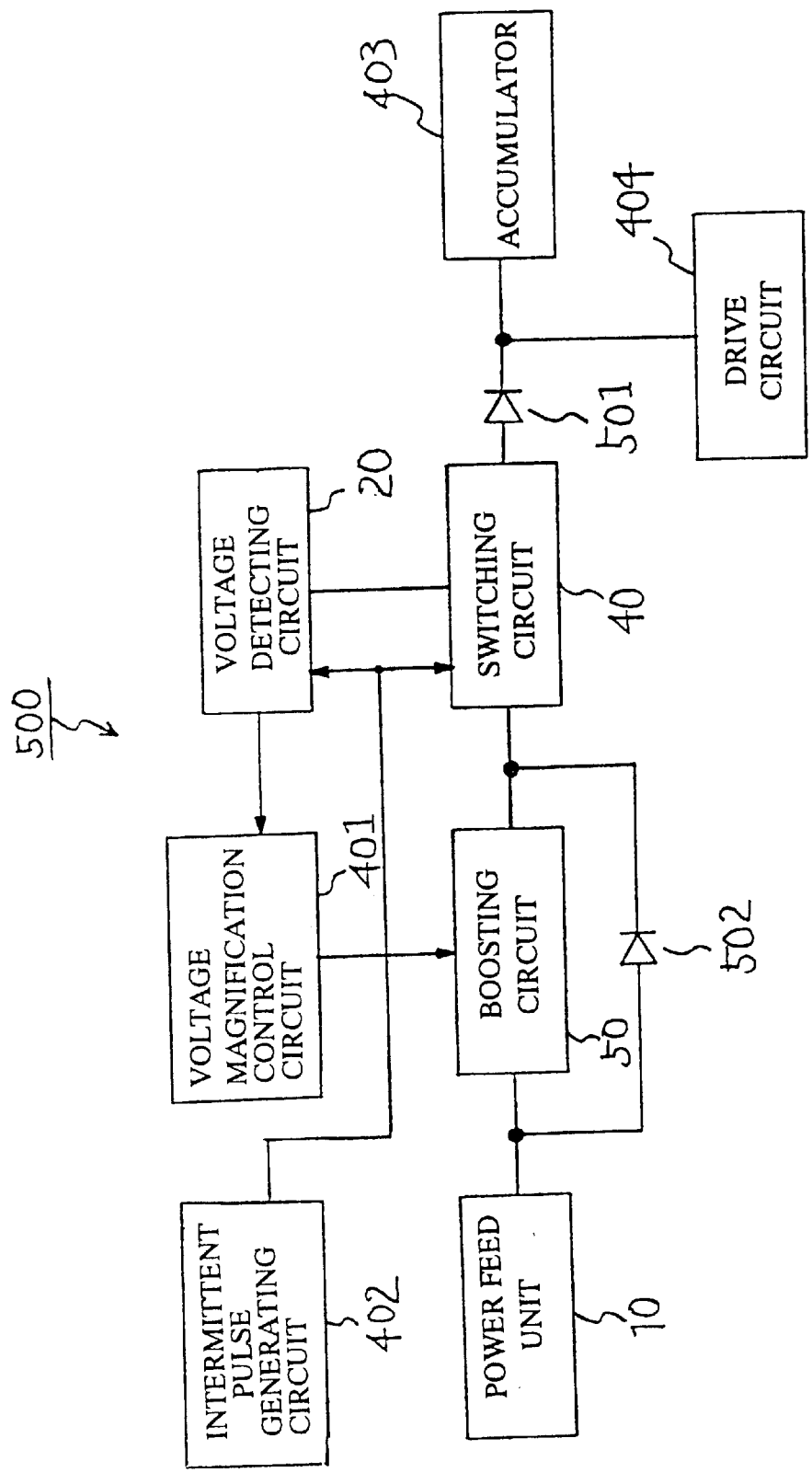
FIG. 5 is a schematic block diagram of an electronic apparatus showing Embodiment 5 of the present invention.

FIG. 5 is a schematic block diagram of an electronic apparatus according to embodiment 5 of the present invention. As shown in FIG. 5, an electronic apparatus 500 is provided with a power feed unit 10 having a feed power or voltage varying in time, a boosting circuit 50 for increasing the voltage of the feed power from the power feed unit 10 and outputting an increased voltage, an accumulator 403 for storing as a storage power the feed power or voltage-increased power, a drive circuit 404 inputted with the feed power, voltage-increased power or stored power to perform drive, a diode element 501 for supplying the voltage-increased power to the accumulator 403 or the drive circuit 404 and preventing the stored power from reversely flowing toward the output of the boosting circuit 50, a diode element 502 for supplying the feed power to the output of the boosting circuit 50 without passing through the boosting circuit 50 and preventing the voltage-increased power from reversely flowing into the power feed unit 10, a voltage detecting circuit 20 for detecting the increased voltage that a voltage of the feed power is increased by the boosting circuit 50 to output a voltage detection signal depending upon the detected voltage, a switching circuit 40 as a power control means that can assume two state depending on time, i.e., a first state in which the feed power or the voltage-increased power is supplied only to the boosting circuit 50, the accumulator 403, or the drive circuit 404 and a second state in which the feed power or the voltage-increased power is supplied only to the voltage detecting circuit 20, a voltage magnification control circuit 410 for outputting to the boosting circuit 50 a voltage magnification control signal dependent upon the voltage detection signal, and an intermittent pulse generating circuit 402 for outputting an intermittent pulse signal.

In the electronic apparatus 500 thus configured, the switching circuit 40 is switched over between the first state and the second state depending on the intermittent pulse. Further, the voltage detecting circuit 20 receives an intermittent pulse to acknowledge that the switching circuit 40 is in the first state. The voltage detecting circuit 20 performs voltage detection each time the first state is entered, and outputs a new voltage detection signal for each of the detected voltages. The boosting circuit 50 changes the voltage magnification in compliance with the voltage magnification control signal. Incidentally, the diode element 502 is provided to store the feed power directly on the accumulator 403 when the feed power voltage of the power feed unit 10 is nearly twice the voltage of the accumulator 403, i.e., when the efficiency of power storage is higher in the case that the feed power is directly stored on the accumulator 403 than in the case that it is stored through the boosting circuit 50 onto the accumulator 403.

Where the switching circuit 40 is not provided in the above configuration and the voltage detecting circuit 20 has to detect an increased voltage of the boosting circuit 50, if the accumulator 403 is low in charge resistance, the increased voltage of the boosting circuit 50 is fixed nearly at a value of the accumulator 403 voltage added by a forward drop voltage across the diode element 501. The increased voltage thereupon is not dependent upon the power feedability of the power feed unit 10. That is, even if the voltage detecting circuit 20 can detect an increased voltage, it is impossible to grasp a power feedability of the power feed unit 10 from that voltage. Accordingly, even if the voltage detecting circuit 20 can output a voltage detection signal, the voltage detection signal is not dependent upon the power feedability. Consequently, the voltage magnification control circuit 401 cannot output a voltage magnification control signal dependent upon the power feedability. It is therefore impossible to set a boosting circuit 50 voltage magnification that is optimal for charge storage on the accumulator 403. As a result, the feed power of the power feed unit 10 cannot be efficiently stored on the accumulator 403, incurring a trouble of difficulty in long-time drive.

In order to cope with this, the provision of the switching circuit 40 as shown in FIG. 5 offers a state in which the voltage-increased power of the boosting circuit 50 not consumed by the accumulator 403 or the drive circuit 404.

The increased power voltage thereupon is not affected by the accumulator 403 voltage or the drive circuit 404 power consumption, thus being a voltage related to the voltage-increased power. Moreover, the voltage of the voltage-increased power is related to the feed power. That is, the voltage of the voltage-increased power detected by the voltage detecting circuit 20 is a voltage dependent upon the power feedability of the power feed unit 10. Accordingly, because the voltage detecting circuit 20 can output a voltage detection signal responsive to the power feedability of the power feed unit 10, the voltage magnification control circuit 401 can output a voltage magnification control signal responsive to the power feedability. Thus, the boosting circuit 50 operates in response to the power feedability and is further allowed to set an optimal voltage magnification for storing charge on the accumulator 403. As a result, the feed power of the power feed unit 10 can be effectively stored on the accumulator 403, allowing the electronic apparatus 500 of the invention to operate for a long period of time.

Incidentally, the method to determine a magnification of the voltage increase dependent on the feed power and best suited for the charge storage on the accumulator 403 is different based on the equivalent circuit of the power feed unit 10, the boosting method for the boosting circuit 50, the kind of the accumulator 403 or the forward drop voltage across the diode element 501. For example, where the power feed unit 10 is of a thermoelectric converting element, the boosting circuit 50 is a switched capacitor type formed by a capacitor and switch means, the accumulator 403 is a Li-based secondary battery low in charge resistance, and the diode element 501 is of a schottky barrier type with an extremely low forward drop voltage, then the voltage is detected by the voltage detecting circuit 20 without consuming the voltage-increased power of the boosting circuit 50. Accordingly, there is a relationship in which the detected voltage is in a value of a voltage at a time that the feed power of the power feed unit 10 is free from consumption multiplied by a voltage magnification. Such a voltage magnification is most ideal that, based on the above relation, a voltage obtained by multiplying by a setting voltage magnification a voltage determined by dividing by a voltage magnification the voltage of the voltage-increased power detected at the voltage detecting circuit 20 becomes equal to twice the voltage on the accumulator 403. Even by employing a setting method other than the method of setting a voltage magnification for the boosting circuit 50 as above, it is needless to say that the voltage magnification of the boosting circuit 50 can well set by the utilization of the present invention. For example, a method may be employed by which the voltage magnification of the boosting circuit 50 is gradually increased when the switching circuit 40 is in the second state, and as soon as the voltage of the voltage-increased power becomes greater than a voltage twice the accumulator 403 voltage, the voltage magnification is immediately fixed at that time. Alternatively, a voltage of the voltage-increased power is detected when the switching circuit 40 is in the second state, and a determination is made as to whether this detected voltage is greater or smaller than a voltage twice the accumulator 403 voltage. If greater, the voltage magnification is gradually decreased so that fixation is made at a voltage magnification in an instance entering smaller. Conversely if smaller, the voltage magnification is gradually increased so that fixation is made at a voltage magnification in an instance entering greater. The voltage magnification can be optimally set also by these methods.

Further, as the time period for which the switching circuit 40 is in the first state becomes shorter and the time interval between the first states longer, the time period that the accumulator 403 is being charged is obtained longer thus enhancing the efficiency of charge storage. These conditions should be optimally set based on the power feedability of the power feed unit 10 or the variation in the feed power.

In the electronic apparatus 500 of the invention shown in FIG. 5, if the apparatus is adopted for a watch by using a generator for the power feed unit 10 and a watch drive circuit for the drive circuit 404, then generated power can be effectively stored on the accumulator. This realizes a watch that operates on generated power for a long period of time. If the operation time is satisfactorily the same as that of the conventional, the generator can be made small in size and light in weight thus realizing a watch operable on correspondingly small, light generated power.

Here, the switching circuit 40 is not limited to the configuration with the function stated as above, but may be in any form provided that it has a function that the feed power from the power feed unit 10 is consumed only by the voltage detecting circuit 20. For example, such a circuit may be configured that no feed power is consumed by the boosting circuit 50 and the drive circuit 404 wherein the supply of feed power to the accumulator 403 is cut off to suspend the operation of the booster circuit 50 and the drive circuit 404. Furthermore, the voltage increased by the boosting circuit 50 to be detected by the voltage detecting circuit 20 may be an increased voltage outputted by the boosting circuit 50. Alternatively, if the boosting circuit 50 is configured to output an intermediate voltage that is higher than the feed power voltage of the feed power unit 10 and lower than the increased voltage generated at an output of the boosting circuit 50, such an intermediate voltage may be used.

(Embodiment 6)

Figure 6:
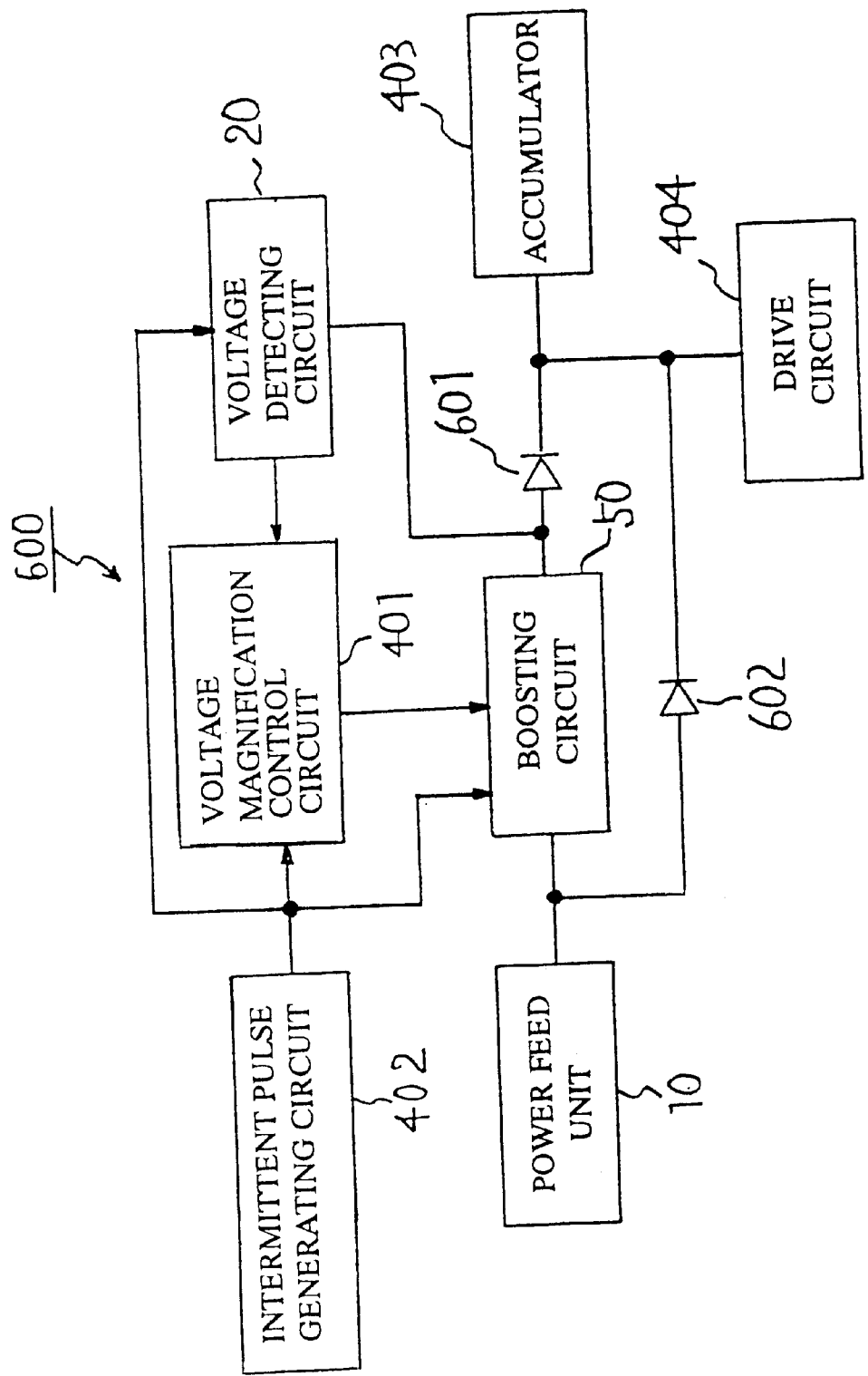
FIG. 6 is a schematic block diagram of an electronic apparatus showing Embodiment 6 of the present invention.
Figure 7:
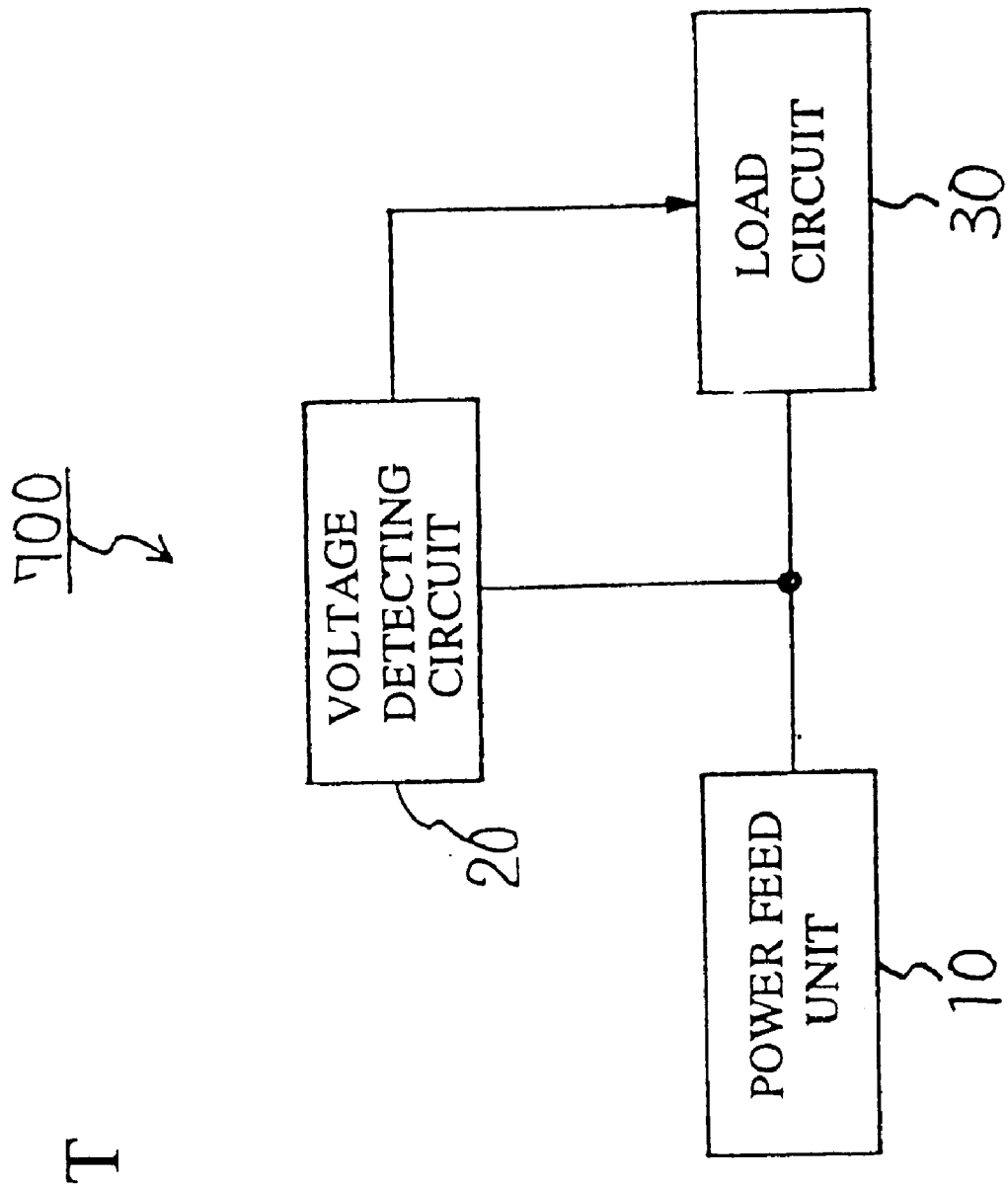
FIG. 7 is a schematic block diagram showing a conventional electronic apparatus.

FIG. 6 is a schematic block diagram of an electronic apparatus according to embodiment 6 of the present invention. As shown in FIG. 6, an electronic apparatus 600 is provided with a power feed unit 10 having a feed power or voltage varying in time, a boosting circuit 50 for increasing the voltage of the feed power from the power feed unit 10 and outputting an increased voltage, an accumulator 403 for storing as storage power the feed power or voltage-increased power, a drive circuit 404 for performing a drive operation due to the feed power, the voltage-increased power or the stored power, a diode element 601 for supplying the voltage-increased power to the accumulator 403 or the drive circuit 404 and preventing the stored power from reversely flowing toward the output of the boosting circuit 50, a diode element 602 for supplying the feed power to the accumulator 403 or the drive circuit 404 without passing through the boosting circuit 50 and preventing the stored power from reversely flowing into the power feed unit 10, a voltage detecting circuit 20 for detecting a voltage of the feed power increased by the boosting circuit 50 to output a voltage detection signal depending on the detected voltage, a voltage magnification control circuit 401 for outputting to the boosting circuit 50 a voltage magnification control signal dependent upon the voltage detection signal, and an intermittent pulse generating circuit 402 for outputting an intermittent pulse signal.

In the electronic apparatus 600 thus configured, the voltage magnification control circuit 401 assumes a first state to output a voltage magnification control signal for fixing a voltage magnification at a low magnification of approximately twice based on intermittent pulse irrespective of a voltage detection signal, or a second state to output a voltage magnification control signal dependent upon a voltage detection signal. Further, the voltage detecting circuit 20 receives an intermittent pulse to acknowledge that the voltage magnification control circuit 401 is in the first state. The voltage detecting circuit 20 performs voltage detection each time the first state comes, and outputs a new voltage detection signal for each of the detected voltages. The boosting circuit 50 changes the voltage magnification in compliance with the voltage magnification control signal. Incidentally, the diode element 602 is provided to store the feed power directly on the accumulator 403 when the feed power voltage of the power feed unit 10 is nearly twice the voltage of the accumulator 403, i.e., when the efficiency of power storage is higher in the case that the feed power is directly stored on the accumulator 403 than in the case that it is stored through the boosting circuit 50 onto the accumulator 403.

In the above configuration, the magnification of the boosting circuit 50 to be controlled by a voltage magnification control signal in the first state requires to be set such that the voltage of the voltage-increased power is greater than a minimum detection voltage by the voltage detecting circuit 20 and below a value of an accumulator 403 voltage added by a forward drop voltage across the diode element 601. By thus setting, the voltage detecting circuit 20 can detect a voltage of a voltage-increased power in the first state, and further this voltage of the voltage-increased power can be detected in a state that the voltage-increased power is not supplied to the accumulator 403 and further not consumed by the drive circuit 404, so that it is not affected by the accumulator 403 voltage or the drive circuit 404 power consumption. That is, as stated so far, that voltage is dependent upon the voltage-increased power and further upon the feed power. Consequently, the voltage of the voltage-increased power detected by the voltage detecting circuit 20 is dependent upon the power feedability of the power feed unit 10. Accordingly, the voltage detecting circuit 20 can output a voltage detection signal responsive to the power feedability of the power feed unit 10, and the voltage magnification control circuit 401 can output a voltage magnification control signal responsive to the power feedability. That is, the boosting circuit 50 can be set at a voltage magnification responsive to power feedability and optimal for storage on the accumulator 403. As a result, the feed power of the power feed unit 10 can be effectively stored on the accumulator 403. Thus the electronic apparatus 600 of the invention configured as above is allowed to operate for a long period of time.

Incidentally, the method used to determine a magnification of voltage increase dependent on feed power and best suited for charge storage on the accumulator 403 is different based on the equivalent circuit of the power feed unit 10, the boosting method of the boosting circuit 50, the kind of the accumulator 403 or the forward drop voltage across the diode element 601. For example, where the power feed unit 10 is a thermoelectric converting element, the boosting circuit 50 is of a switched capacitor type formed by a capacitor and switch means, the accumulator 403 is a Li-based secondary battery low in charge resistance, and the diode element 601 is of a schottky barrier type with an extremely low forward drop voltage, there is no consumption in the voltage-increased power of the boosting circuit 50. Accordingly, the voltage detected by the voltage detecting circuit 20 is in a relationship that it is at a value of a voltage, at a time the power feed voltage of the power feed unit 10 is not consumed, multiplied by a voltage magnification. The voltage magnification is most ideally set such that, based on the relationship, the voltage determined by dividing a voltage of a voltage-increased power detected at the voltage detecting circuit 20 by a voltage magnification at that time and then multiplying it by a voltage magnification is equal to a voltage of twice the voltage on the accumulator 403.

Furthermore, as the time period for which the voltage magnification control circuit 401 is in the first state becomes shorter and the time interval between the first states longer, the time period for which the accumulator 403 is being charged can be taken longer thus resulting in higher charge storing efficiency. However, these conditions should be optimally set based on the power feedability of the power feed unit 10 and the variation in feed power.

If the electronic apparatus 600 of the invention shown in FIG. 6 is adopted for a watch by using the power feed unit 10 as a generator and the drive circuit 404 as a watch drive circuit, then generated power can be effectively stored on the accumulator. This realizes a watch that operates on generated power for a long period of time. If the operation time is satisfactorily the same as that of the conventional, the generator can be made small in size and light in weight thus realizing a watch operable on correspondingly small, light generated power.

Furthermore, the voltage increased by the boosting circuit 50, to be detected by the voltage detecting circuit 20, may be an increased voltage outputted by the boosting circuit 50. Alternatively, if the boosting circuit 50 is configured to output an intermediated increased voltage that is higher than the feed power voltage of the feed power unit 10 and lower than the increased voltage occurring at an output of the boosting circuit 50, such intermediate voltage may be used.

In the above-described embodiments, the higher the impedance of the input to the voltage detecting circuit 20, at higher accuracy the voltage detecting circuit 20 can grasp a power. Accordingly, the input is preferably as high as possible. Meanwhile, the power feed unit 10 may be in any form provided of which a power feedability or feed power voltage varying in time. Particularly, the present invention is effective for cases where a thermoelectric converting element is used of which generated power or its voltage suffers decrease due to reduction in size or weight. Also, the boosting circuit 50 may use any voltage-increasing method but preferably a switched capacitor method formed by a switch and capacitor that is small in size, light in weight and high in efficiency.

According to the present invention, for an electronic apparatus operating on feed power from a power feed unit having a feed power or feed power voltage varying in time of a generator, it is possible to detect that there is a feed power even where the power feedability of the power feed unit is lowered and the feed power voltage is lowered due to reduction in size and weight of the electronic apparatus. Consequently, if any level of feed power is outputted by the power feed unit, the load circuit and the like can be controlled in response thereto. Furthermore, because the power feedability of the power feed unit is grasped, the load circuit and the like can be controlled in response to the power feedability.

Furthermore, where the feed power voltage is low and the drive circuit cannot be driven by the feed power, the drive circuit can be driven by a power with a voltage increased higher than a driving-circuit driveable voltage by the boosting circuit. The remaining portion of the increased voltage is stored on the accumulator. When the feed power and hence voltage-increased power are not available, the drive circuit is driven by the stored power on the accumulator. In such an electronic apparatus, the power feedability of the power feed unit can be grasped as stated before. Accordingly, it is possible to set the boosting circuit at an optimal voltage magnification for charge storage on the accumulator in compliance with the power feedability of the power feed unit. That is, because the feed power can be effectively stored on the accumulator, the above-configured electronic apparatus can be operated for a long period of time. If the operating time is determined same, the power feed unit can be reduced in size and weight, correspondingly reducing the size and weight of the electronic apparatus.

What is claimed is:

1. An electronic apparatus comprising:
   a power feed unit for producing a supply power which varies with time;
   a voltage detecting circuit for detecting the voltage of the supply power and outputting a corresponding voltage detection signal;
   a load circuit driven by the supply power and changing a drive state responsive to the voltage detection signal; and
   a switching circuit for receiving the supply power and selectively outputting the supply power to only one of the load circuit and the voltage detecting circuit, so that the voltage of the supply power is detected by the voltage detecting circuit when the supply power is not driving the load circuit.

2. An electronic apparatus according to claim 1; further comprising a boosting circuit for boosting the supply power and outputting a voltage-increased supply power so that the voltage detecting circuit can detect whether the voltage of the supply power is sufficient to drive the load circuit.

3. An electronic apparatus according to claim 2; wherein the boosting circuit boosts the voltage of the supply power.

4. An electronic apparatus comprising:
   a power feed unit for producing a voltage which varies with time;
   a boosting circuit for increasing a voltage of the supply power to generate a voltage-increased power;
   a load circuit driven by at least one of the supply power and the voltage-increased power;
   power control means for controlling whether or not the supply power is to be consumed by the boosting circuit and the load circuit; and
   a voltage detecting circuit for detecting the voltage of the voltage-increased power and outputting a voltage detection signal responsive to the detected voltage only when the power control means is in a state where the supply power or the voltage-increased power is not being consumed by the load circuit.

5. An electronic apparatus comprising:
   a power feed unit for producing a supply power which varies with time;
   a boosting circuit for increasing a voltage of the supply power to generate a voltage-increased power;
   reverse current flow preventing means;
   an accumulator for storing as a stored power at least one of the voltage-increased power and the supply power supplied through the reverse current flow preventing means;
   a drive circuit for effecting a drive operation and being powered by at least one of the supply power, the voltage-increased power and the stored power;
   power control means for controlling whether or not the supply power is to be consumed by the boosting circuit or the drive circuit, and for controlling whether or not the supply power is to be stored in the accumulator;
   a voltage detecting circuit for detecting the voltage of the supply power and outputting a voltage detection signal responsive to the detected voltage only when the power control means is in a state where the supply power is not being consumed by the boosting circuit and the drive circuit and where the supply power is not being stored in the accumulator; and
   a voltage magnification control circuit for generating a voltage magnification control signal responsive to the voltage detection signal for controlling the voltage magnification of the boosting circuit;
   whereby the voltage magnification of the boosting circuit is changed in accordance with the voltage magnification control signal.

6. An electronic apparatus comprising:
   a power feed unit for producing a supply power which varies with time;
   a boosting circuit for increasing a voltage of the supply power to generate a voltage-increased power;
   reverse current flow preventing means;
   an accumulator for storing as a stored power at least one of the voltage-increased power and the supply power supplied through the reverse current flow preventing means;
   a drive circuit for effecting a drive operation and being powered by at least one of the supply power, the voltage-increased power and the stored power;
   power control means for controlling whether or not the supply power or the voltage-increased power is to be consumed by the drive circuit, and for controlling whether or not the supply power or the voltage-increased power is to be stored in the accumulator;
   a voltage detecting circuit for detecting the voltage of the voltage-increased power and outputting a voltage detection signal responsive to the detected voltage only in a state where the voltage-increased power is not being consumed by the drive circuit and where the voltage-increased power is not being stored in the accumulator; and
   a voltage magnification control circuit for generating a voltage magnification control signal responsive to the voltage detection signal for controlling the voltage magnification of the boosting circuit;
   whereby the voltage magnification of the boosting circuit is changed in accordance with the voltage magnification control signal.

7. An electronic apparatus comprising:
   a power feed unit for producing a supply power which varies with time;
   a boosting circuit having a settable voltage magnification for increasing a voltage of the supply power to generate a voltage-increased power;
   reverse current flow preventing means;
   an accumulator for storing as a stored power at least one of the supply power supplied through the reverse current flow preventing means and the voltage-increased power;
   a drive circuit for effecting a drive operation and being powered by at least one of the supply power, the voltage-increased power and the stored power;
   a voltage detecting circuit for detecting the voltage of the voltage-increased power and outputting a voltage detection signal responsive to the detected voltage; and
   a voltage magnification control circuit for generating a voltage magnification control signal responsive to the voltage detection signal for controlling the voltage magnification of the boosting circuit;

wherein the voltage magnification of the boosting circuit is changed in accordance with the voltage magnification control signal;

the voltage magnification control circuit has a first state in which the voltage magnification control signal is output in response to the voltage detection signal and a second state in which is output a voltage magnification control signal having a voltage magnification lower than that output in the first state; and the voltage detecting circuit detects only in the second state the voltage of the voltage-increased power and outputs a voltage detection signal in accordance with the detected voltage.

8. An electronic apparatus comprising:

a power feed unit for producing a supply power which varies with time;

a boosting circuit for increasing a voltage of the supply power to generate a voltage-increased power;

a load circuit driven by the voltage-increased power; and a voltage detecting circuit for detecting a voltage of the voltage-increased power and outputting a voltage detection signal responsive to the detected voltage and for outputting a load circuit suspending signal to suspend operation of the load circuit when the voltage of the voltage-increased power is lower than a predetermined voltage level.

9. An electronic apparatus comprising:

a power feed unit for producing a supply power which varies with time;

a boosting circuit for increasing a voltage of the supply power to generate a voltage-increased power;

a load circuit driven by the voltage-increased power and having a minimum driving voltage at which the load circuit can operate;

power control means for stopping the supply of the voltage-increased power to the load circuit when a voltage of the voltage-increased power is lower than the minimum driving voltage of the load circuit and for stopping the supply of the voltage-increased power to the load circuit when detection of the voltage of the voltage-increased power is desired; and a voltage detecting circuit for detecting the voltage of the voltage-increased power only when the power control means has stopped the supply of the voltage-increased power to the load circuit, and for outputting a voltage detection signal responsive to the detected voltage.

10. An electronic apparatus comprising:

a power feed unit for producing a supply power which varies with time;

a load circuit driven by the supply power;

power control means for stopping the supply of the supply power to the load circuit when a voltage of the supply power is lower than a minimum driving voltage of the load circuit and for stopping the supply of the supply power to the load circuit when detection of the voltage of the supply power is desired; and a voltage detecting circuit for detecting the voltage of the supply power only when the power control means has stopped the supply of the supply power to the load circuit, and for outputting a voltage detection signal responsive to the deteccted voltage.

11. An electronic apparatus comprising:

a power feed unit for producing a supply power which varies with time;

a boosting circuit having a settable voltage magnification for increasing a voltage of the supply power to generate a voltage-increased power;

power control means for controlling whether or not the supply power is supplied to the boosting circuit;

a voltage detecting circuit for detecting the voltage of the supply power only when the power control means prevents the supply power from being supplied to the load circuit, and for outputting a voltage detection signal responsive to the detected voltage; and a voltage magnification control circuit for generating a voltage magnification control signal in response to the voltage detection signal;

wherein the voltage magnification of the boosting circuit is changed in accordance with the voltage magnification control signal.

12. An electronic apparatus according to claim 11; further comprising an accumulator for storing the voltage-increased power and outputting a stored power, a first reverse current flow preventing means for preventing current flow from the accumulator to the boosting circui, a second reverse current flow preventing means for preventing current flow from the accumulator to the power control means, and a drive circuit for performing a drive operation and being powered by at least one of the voltage-increased power and the stored power; wherein the power control means controls whether or not the voltage-increased power is to be stored in the accumulator, and the voltage detecting circuit detects the voltage of the supply power only when the power control means prevents the voltage-increased power from being stored in the accumulator and outputs a voltage detection signal in response to the detected voltage.

13. An electronic apparatus comprising:

a power feed unit for producing a supply power which varies with time;

a boosting circuit having a settable voltage magnification for increasing a voltage of the supply power to generate a voltage-increased power;

a drive circuit driven by the voltage-increased power;

power control means for controlling whether or not the voltage-increased power is supplied to the drive circuit;

a voltage detecting circuit for detecting a voltage of the voltage-increased power only when the power control means prevents the supply of the voltage-increased power to the drive circuit, and for outputting a voltage detection signal responsive to the detected voltage; and a voltage magnification control circuit for generating a voltage magnification control signal responsive to the voltage detection signal;

wherein the voltage magnification of the boosting circuit is changed in accordance with the voltage magnification control signal.

14. An electronic apparatus according to claim 13; further comprising an accumulator for storing the voltage-increased power and outputting a stored power, and a reverse current flow preventing means provided between the power control means and the accumulator; wherein the power control means controls whether or not the voltage-increased power is stored in the accumulator, and the voltage detecting circuit detects the voltage of the voltage-increased power only when the power control means prevents the supply of the voltage-increased power to the accumulator in order to prevent the accumulator from storing the voltage-increased power, and outputs a voltage detection signal responsive to the detected voltage.

15. An electronic apparatus comprising:
- a power feed unit for producing a supply power which varies with time;
- a boosting circuit having a settable voltage magnification for increasing a voltage of the supply power to generate a voltage-increased power;
- an accumulator for storing an input power and outputting a stored power;
- reverse current flow preventing means provided between the boosting circuit and the accumulator;
- a voltage detecting circuit for detecting a voltage of the voltage-increased power and outputting a voltage detection signal responsive to the voltage of the voltage-increased power;
- a voltage magnification control circuit for generating a voltage magnification control signal responsive to the voltage detection signal and for controlling the voltage magnification of the boosting circuit; and
- an intermittent pulse generating circuit for outputting an intermittent pulse signal to the voltage magnification control circuit;
- wherein the voltage magnification control circuit has a first operation state in which a first voltage magnification control signal is output in accordance with the intermittent pulse signal and a second operation state in which a second voltage magnification control signal is output in accordance with the voltage detection signal, the first voltage magnification control signal resulting in a lower voltage magnification of the boosting circuit than the second voltage magnification control signal; and
- wherein the voltage detecting circuit detects the voltage of the voltage-increased power only during the first operation state of the voltage magnification control circuit and outputs the voltage detection signal responsive to the voltage of the voltage-increased power.

* * * * *